US005755904A

United States Patent [19]
Longo et al.

[11] Patent Number: 5,755,904
[45] Date of Patent: May 26, 1998

[54] METHOD FOR CEMENTLESS BUILDING OF RETREADED TIRES

[75] Inventors: Trent F. Longo, Findlay; Charles J. Wollenzier, North Olmsted; Gordon T. Franks; Patrick J. Quinlan, both of Findlay; Michael D. Shaffer, Bluffton, all of Ohio

[73] Assignee: Hercules Tire and Rubber Company, Findlay, Ohio

[21] Appl. No.: 761,485

[22] Filed: Dec. 6, 1996

Related U.S. Application Data

[62] Division of Ser. No. 412,458, Mar. 29, 1995, Pat. No. 5,635,015.

[51] Int. Cl.$^6$ ............................................. B29D 30/52
[52] U.S. Cl. ..................... 156/96; 156/123; 156/130.5; 156/322; 156/406.4
[58] Field of Search ............................ 156/96, 405.1, 156/406.4, 406.6, 128.1, 128.6, 909, 380.9, 273.3, 273.5, 322, 499, 130.5

[56] References Cited

U.S. PATENT DOCUMENTS

| | | | |
|---|---|---|---|
| 3,413,174 | 11/1968 | Porter | 156/405.1 |
| 3,728,181 | 4/1973 | Simmons, Jr. | 156/96 |
| 3,746,597 | 7/1973 | Appleby et al. | 156/406.6 |
| 3,989,563 | 11/1976 | Schelkmann | 156/96 |
| 4,096,008 | 6/1978 | Taylor | |
| 4,149,926 | 4/1979 | Taylor | 156/322 |
| 4,457,802 | 7/1984 | Yanagihara et al. | 156/405.1 |
| 4,596,617 | 6/1986 | Ishii | 156/128.1 |
| 5,059,268 | 10/1991 | Satoh et al. | 156/405.1 |
| 5,342,473 | 8/1994 | Bibona et al. | 156/96 |
| 5,458,727 | 10/1995 | Meyer | 156/96 |

*Primary Examiner*—Geoffrey L. Knable
*Attorney, Agent, or Firm*—Pearne, Gordon, McCoy & Granger LLP

[57] ABSTRACT

An Apparatus for applying cushion gum to a periphery of a tire casing without cement includes a conveyor having a forward roller near the tire casing. The conveyor is mounted on a carriage that is movable relative to its base so that the conveyor can be moved to contact the tire casing. The conveyor moves the cushion gum below an infrared heater to heat an interface side of the cushion gum to increase its tack and then moves the heated cushion gum between the forward roller and the tire casing. The forward roller of the conveyor applies the cushion gum to the periphery of the tire as the cushion gum exits the conveyor and first contacts the tire casing. A supply roller is provided to move the cushion gum from a supply roll to the rear end of the conveyor. A cutting mechanism is provided between the supply roller and the conveyor to selectively cut the cushion gum.

11 Claims, 5 Drawing Sheets

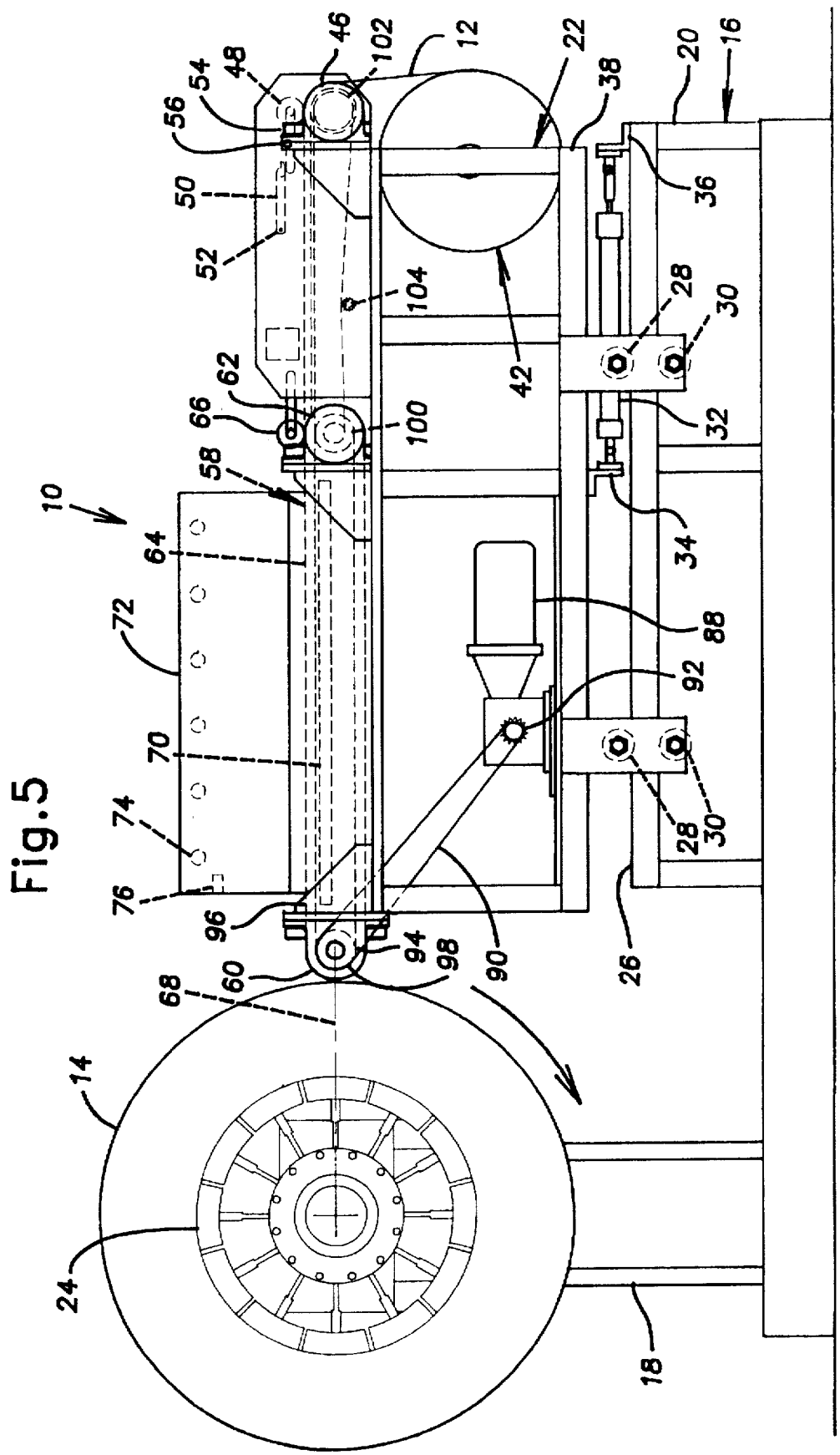

METHOD FOR CEMENTLESS BUILDING OF RETREADED TIRES

This is a divisional of application Ser. No. 08/412,458, filed Mar. 29, 1995, now U.S. Pat. No. 5,635,015.

BACKGROUND OF THE INVENTION

1. Field of the Invention

The present invention relates to an apparatus for cementless building of retreaded tires, and more particularly, to an apparatus that heats and applies cushion gum material to a tire casing.

2. Description of Related Art

In a tire retreading process, a strip or web of rubber bonding material or cushion gum is applied to the periphery of a buffed tire casing. Typically a cement, such as a rubber/hydrocarbon solvent solution, is first applied to the tire casing to provide the necessary tack to firmly hold the cushion gum material to the tire casing during subsequent stitching, tread application, and curing. The step of applying cement is costly and time consuming because the cement must be applied and allowed to dry before the cushion gum material can be affixed. Additionally, the use of solvent based cements or adhesives can cause safety and environmental concerns.

The cement can be eliminated from the process by heating the cushion gum material because the tack of a rubber compound, such as the cushion gum material, increases as it is heated. One approach has been to warm entire rolls of the cushion gum in an oven. This approach, however, can cause a decrease in material shelf life due to the short scorch time of the cushion gum material. This is particularly a problem if the material is not used promptly after heating.

Another approach has been to heat the cushion gum material as it is being applied to the tire casing. For example, see U.S. Pat. No. 4,096,008, the disclosure of which is expressly incorporated herein in its entirety by reference, disclosing a method of manufacturing and retreading tires. The cushion gum material is pulled from a supply roll, heated at an outer surface, pulled around and applied to the tire casing, and subsequently pressured by rollers to the tire casing. Heating the cushion gum material at an outer surface to increase the amount of tack at an inner surface can result in overheating or scorching the cushion gum material. Additionally, tensioning the cushion gum material can stretch the cushion gum material and result in an uneven thickness. Furthermore, applying and pressuring the cushion gum to the tire casing in separate steps can result in entrapped air between the tire casing and the cushion gum material. Accordingly, there is a need in the art for an improved apparatus for cementless building of retreaded tires.

SUMMARY OF THE INVENTION

The present invention provides an apparatus for applying cushion gum to a periphery of a tire casing that solves the above-noted problems of the related art. The apparatus according to the invention includes a heater for heating the cushion gum and a conveyor for moving the cushion gum near the heater such that an interface side of the cushion gum is heated. The apparatus also includes a roller adjacent the periphery of the tire and means for moving the roller against the tire casing. The conveyor moves the heated cushion gum between the roller and the tire casing so that the heated cushion gum is pressured to the tire casing as the interface side of the cushion gum first contacts the tire casing.

BRIEF DESCRIPTION OF THE DRAWINGS

These and further features of the present invention will be apparent with reference to the following description and drawings, wherein:

FIG. 5 is an elevational view of the apparatus of FIG. 1 with the carriage moved toward the tire casing.

DETAILED DESCRIPTION OF THE PREFERRED EMBODIMENT

Figure 1:
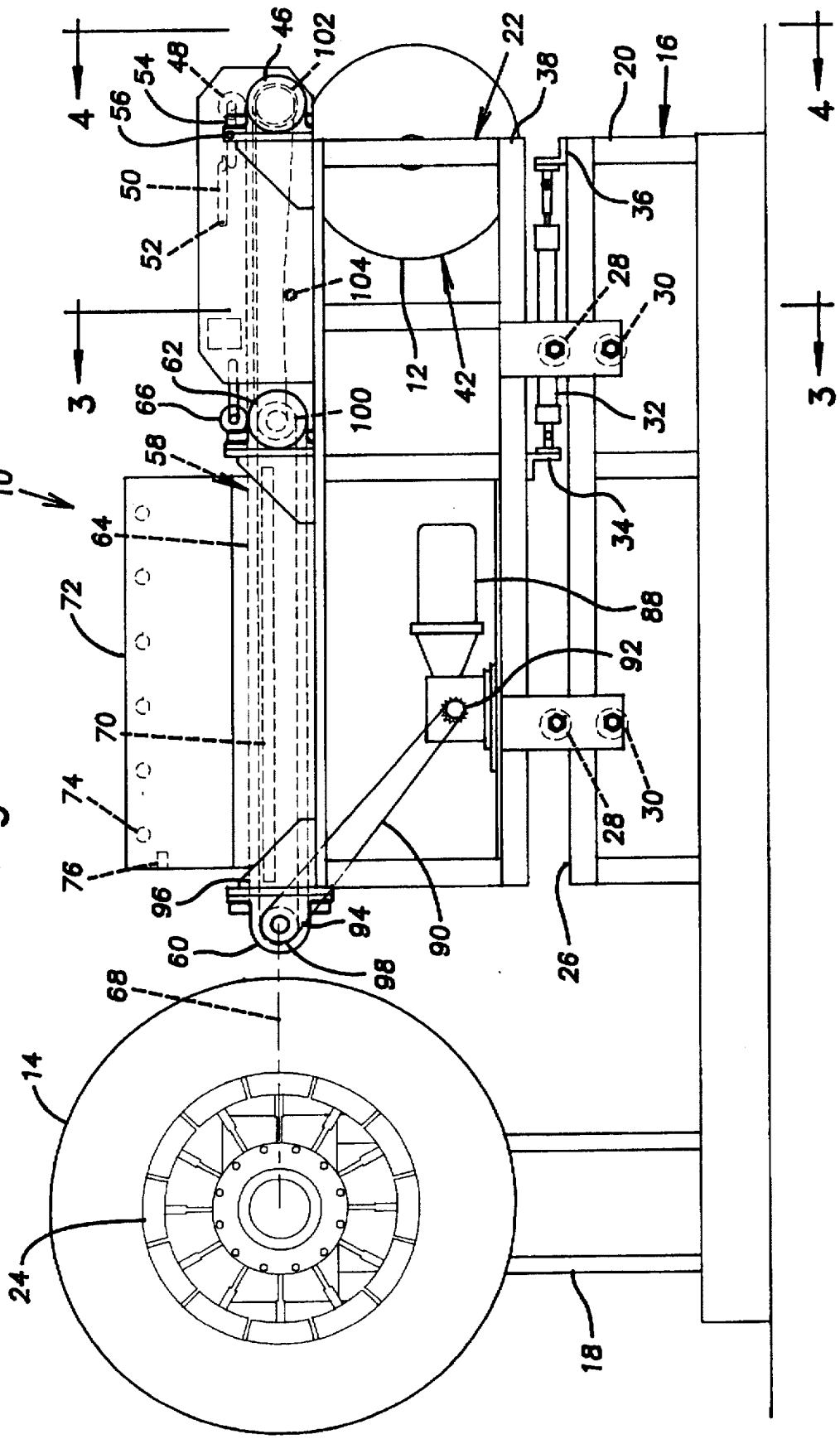
FIG. 1 is an elevational view an apparatus for cementless building of retreaded tires according to the present invention.

FIG. 1 shows an apparatus 10 for applying cushion gum material 12 to the periphery of a tire casing 14 according to the present invention. The apparatus 10 includes a frame 16 having a tire support 18, a base 20, and a movable carriage 22. The tire support 18 includes an expandable hub 24 for engaging and rotatably supporting the tire casing 14 about a horizontal and transverse axis of rotation.

Figure 4:
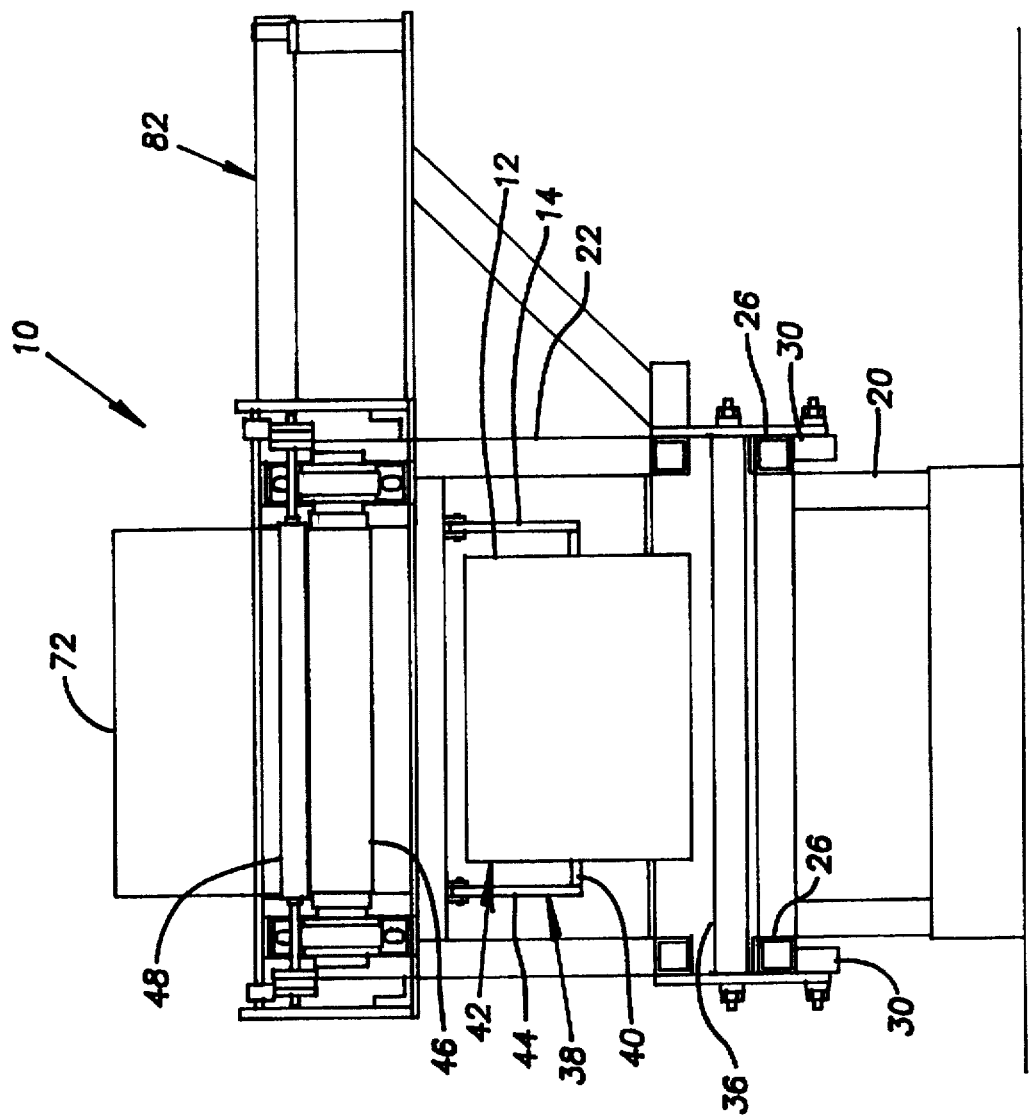
FIG. 4 is an elevational view taken along line 4—4 of FIG. 1.

The base 20 includes a pair of longitudinally extending horizontal supports 26. As seen in FIGS. 1 and 4, the carriage 22 includes four pairs of rollers 28, 30. Two pairs of the rollers 28, 30 are located at each horizontal support 26 of the base 20. Each pair of rollers 28, 30 is spaced about one of the horizontal supports 26 so that an upper roller 28 is in rolling contact with an upper surface of the horizontal support 26 and a lower roller 30 is in rolling contact with a lower surface of the horizontal support 26. Positioned in this manner the rollers 28, 30 guide and support the carriage 22 so that the carriage 22 is movable in a longitudinal direction relative to the base 20 toward and away from the tire support 18.

An indexing means 32 is provided between the carriage 22 and the base 20 for moving the carriage 22 toward and away from the tire casing 14. The indexing means 32 of the illustrated embodiment is a pneumatic or air cylinder. The air cylinder is mounted in a longitudinal direction between angle supports 34, 36 attached to the carriage 22 and the base 20. It will be noted that other indexing means 32 for moving the carriage 20 could be utilized such as, for example, a rack and pinion, a spring mechanism, a hydraulic cylinder, or an electric motor.

As best seen in FIG. 4, the carriage 22 also includes a swinging bar 38 at a rear end of the carriage 22. The swinging bar 38 has a transversely extending horizontal portion 40 for holding a cushion gum material supply roll 42 and upwardly extending vertical portions 44 at ends of the horizontal portion 40. The cushion gum material 12 on the supply roll 42 is a relatively thin sheet and typically has a polyethylene film or liner on its outer side to prevent the cushion gum material 12 from sticking to itself. The supply roll 42 is supported by the horizontal portion 40 of the swinging bar 38 so that the supply roll 42 rotates as the cushion gum material 12 is pulled from the supply roll 42. An upper end of each vertical portion 44 is hingedly attached to the carriage 22 so the swinging arm 38 pivots about a transversely extending horizontal axis. The swinging bar 38 thereby minimizes tensioning or stretching of the cushion gum material 12 as it is pulled from the supply roll 42.

Figure 2:
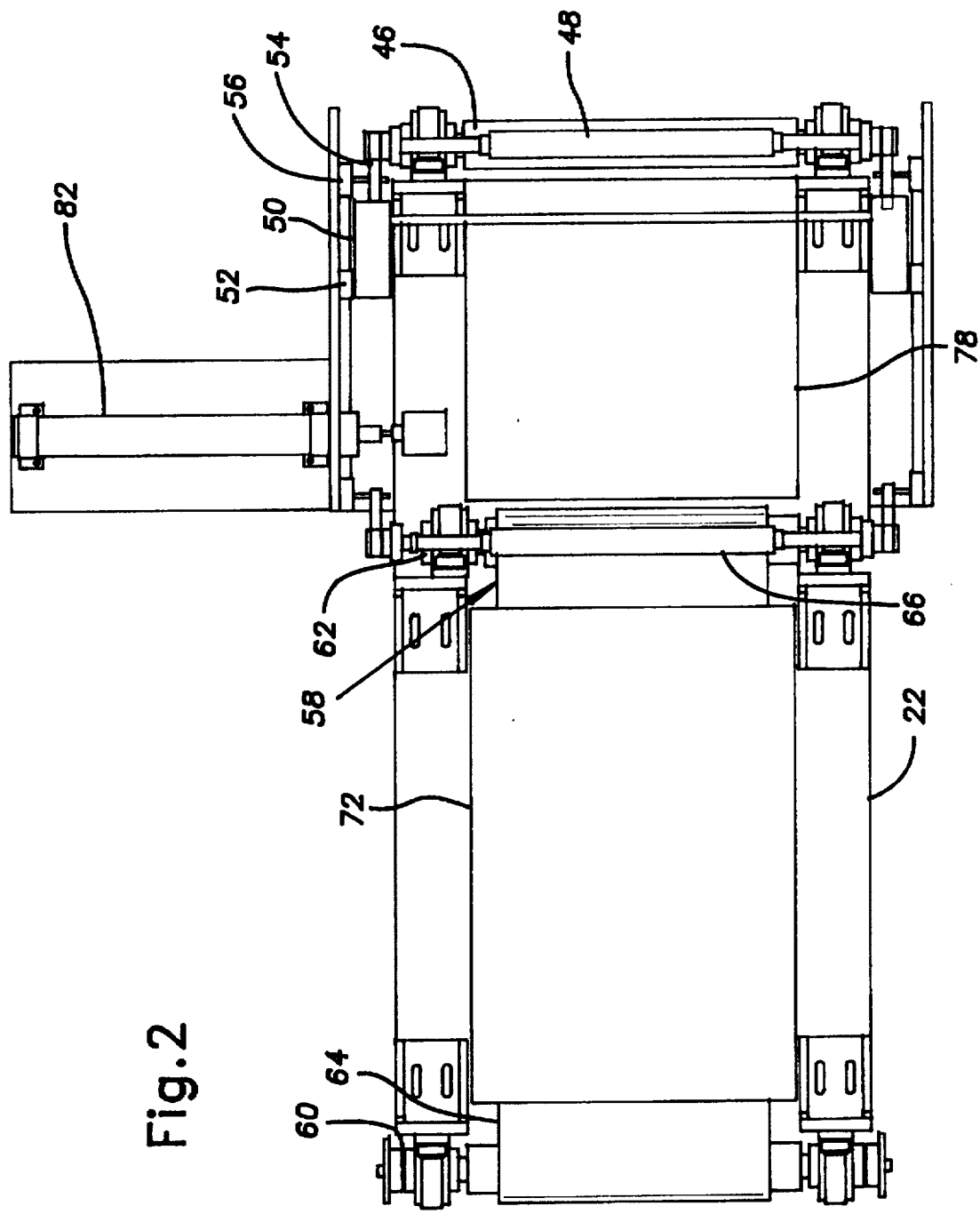
FIG. 2. is a plan view of the apparatus of FIG. 1.

As best seen in FIGS. 1 and 2, a supply roller 46 is mounted on the carriage 22 at the rear end of the carriage 22 and above the supply roll 42 of cushion gum material 12. The supply roller 46 has an associated pinch or pressure roller 48 located at its upper side. The pressure roller 48 must supply enough pressure so that the cushion gum material 12 is pulled off of the supply roll 42, yet not enough pressure to stick or adhere to the cushion gum material 12. A cam lever 50 is provided to raise the pressure roller 48 and remove the pressure so that no cushion gum material 12 is pulled from the supply roll 42.

The cam lever 50 downwardly pivots about a forward pivot point 52 so that a rear end downwardly cams a forward end of a pressure roller support 54. The pressure roller support 54 pivots about a central pivot point 56 so that a rear end of the pressure roller support 54 rotates upwardly to raise the pressure roller 48 away from the supply roller 46.

A heater conveyor 58 is mounted to the carriage 22 at a forward end of the carriage 22. The heater conveyor 58 is positioned so that the cushion material 12 is moved to the forward end of the carriage 20 in a generally horizontal path. The heater conveyor 58 includes horizontally extending forward and rear rollers 60, 62 and an endless belt 64. The rear roller 62 has an associated pinch or pressure roller 66 located at its upper side. The pressure roller 66 must supply enough pressure so that the cushion gum material 12 is pulled onto the heater conveyor 58, yet not enough pressure to stick or adhere to the cushion gum material 12. A centerline 68 of the heater conveyor 58 generally intersects the rotational axis of the tire casing 14 as seen in FIG. 1. The heater conveyer 58 can also include a suction device 70 to hold the cushion gum material 12 on the endless belt 64 of the heater conveyor 58 to prevent or minimize bunching and/or tensioning of the cushion gum material 12.

The heater conveyor 58 extends through an oven or heater 72. The heater 72 includes a series of infrared heating elements 74 which are positioned above the heater conveyor 58 to heat the cushion gum material 12 as it is carried through the heater 72 by the heater conveyor 58. The infrared heating elements 74 can be of any suitable type such as, for example, incandescent quartz heat lamps. The heating elements 74 are controlled with a thermocouple 76 to heat the cushion gum material 12 to a temperature at which the tack of the cushion gum material 12 is increased but the cushion gum material 12 is not overly softened or scorched. The temperature is preferably in the range of about 100 degrees Fahrenheit (F.) to about 200 degrees F. and is more preferably about 150 degrees F. It will be noted that the cushion gum material 12 passes under the heating elements 74 such that an interface side of the cushion gum material 12, that is a side of the cushion gum material 12 that will contact the periphery of the tire casing 14, is heated. Heating the interface side minimizes the amount of heat required for the interface side to become tacky, and therefore, the interface side becomes tacky without scorching the cushion gum material 12 and without overly softening the cushion gum material 12 so that it is vulnerable to stretching.

Figure 3:
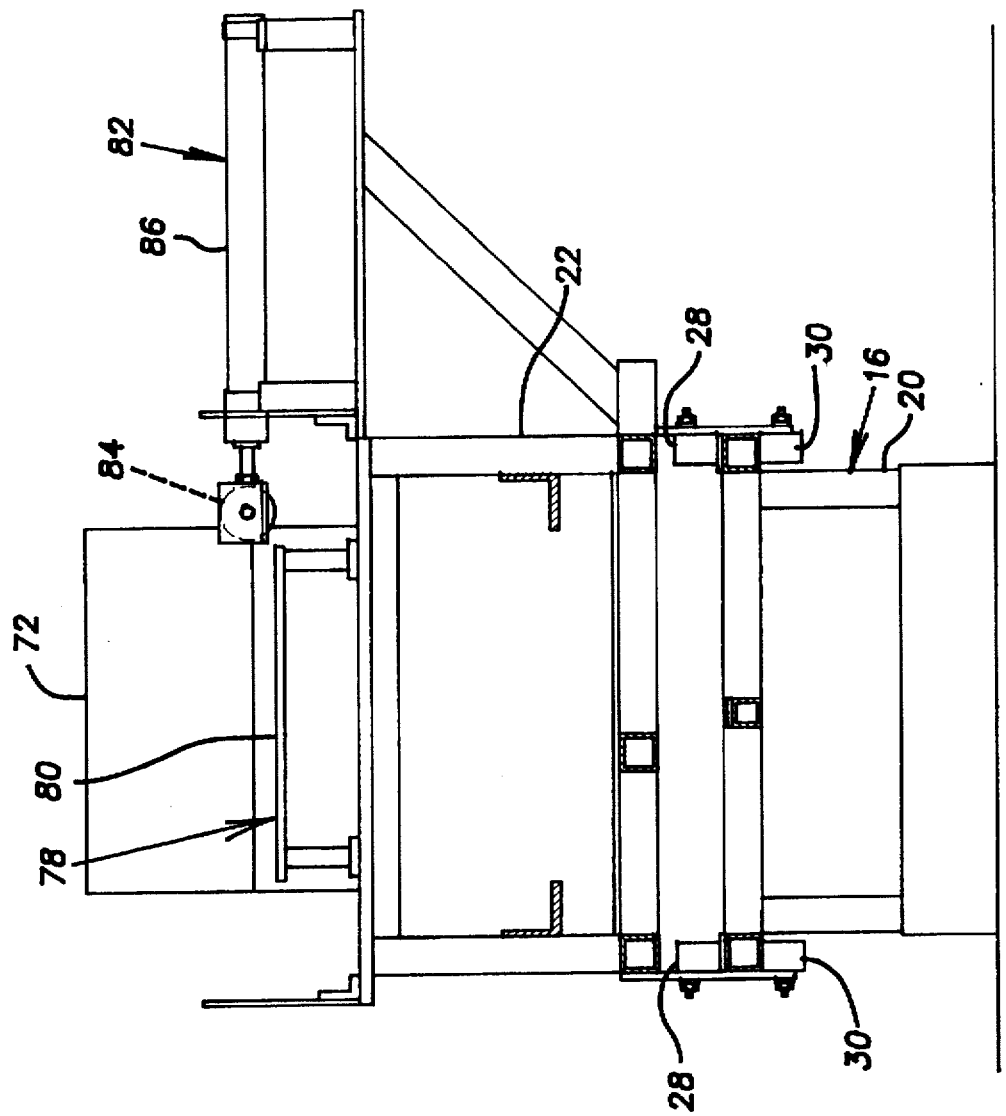
FIG. 3 is a sectional view taken along line 3—3 of FIG. 1.

As best seen in FIGS. 2 and 3, a cutting anvil 78 is located between the supply roller 46 and the heater conveyor 58 to provide a smooth transition between the supply roller 46 and heater conveyor 58 and also provide a suitable surface for cutting the cushion gum material 12. The cutting anvil 78 includes a substantially flat plate 80 mounted generally horizontal at a height generally equal to an upper surface of the supply roller 46 and the heater conveyor 58. A cutting mechanism 82 is located between the supply roller 46 and the heater conveyor 58 and is aligned with the cutting anvil 78. The cutting mechanism 82 of the illustrated embodiment includes a rotary cutter 84 and a transversely extending air cylinder 86 for transversely moving the rotary cutter 84 across the cutting anvil 78 to shear the cushion gum material 12. It will be noted that other cutting mechanisms 82 could be utilized such as, for example, a hot wire or a shearing knife.

As best seen in FIG. 1, the supply roller 46 and heater conveyor 58 are driven by a drive motor 88 and a series of drive chains and sprockets. The single drive motor 88 enables the cushion gum material 12 to be moved without causing tensioning or stretching of the cushion gum material 12. The drive motor 88 is mounted to the carriage 22 near the forward end of the carriage 22. The drive motor 88 is preferably a D.C. gear motor capable of conveying the cushion gum material 12 at a speed of about 0.5 feet/second to about 2 feet/second. A first drive chain 90 extends from a sprocket 92 driven by the drive motor 88 and a first sprocket 94 mounted on the forward roller 60 of the heater conveyor 58. A second drive chain 96 extends from a second sprocket 98 mounted on the forward roller 60, a sprocket 100 mounted to the rear roller 62 of the heater conveyor 58, and a sprocket 102 mounted on the supply roller 46. The second drive chain 96 is kept in constant tension by a tensioning device or sprocket 104 as known in the art.

To apply the cushion gum material 12, the tire casing 14 is installed on the expandable hub 24 and inflated with air to a pressure of about 10 to about 30 psig. The carriage 22 is then indexed toward the tire casing 14 by supplying air to the air cylinder 32 until the forward roller 60 of the heater conveyor 58 contacts and sufficiently deflects the tire casing 14 to flatten a crown on the periphery of the tire casing 14 as best seen in FIG. 5. Typically about 10 to about 30 pounds of pressure are applied. This procedure allows the apparatus 10 to apply cushion gum material 12 to any size of tire casing 14.

The end of the cushion gum material 12 is pulled up to the supply roller 46 and fed between the pressure roller 48 and the supply roller 46 and across the cutting anvil 78 to the cutting mechanism 82. In this position the liner side of the cushion gum material 12 is contacting the cutting anvil 78 and the interface side of the cushion gum material 12, that is the side that will contact the tire casing 14, is facing upward. The cutting mechanism 74 is activated and the air cylinder 86 moves the rotary cutter 84 across the cushion gum material 12 to cut an even starting edge. The rotary cutter 84 is then returned to its home position. This initial cutting operation is only necessary with a new supply roll 42 of cushion gum material 12 or if the end of the cushion gum material 12 is damaged.

The drive motor 88 is activated and the cushion gum material 12 moves under the pressure roller 66 of the heater conveyor 58 and onto the endless belt 64 of the heater conveyor 58 and is moved through the heater 72 at a speed of about 0.5 to 2 feet/second. As the cushion gum material 12 passes through the heater 72, the infrared heating elements 74 heat the interface side of the cushion gum material 12 to about 150 degrees F. or at least a temperature where the interface side of the cushion gum material 12 becomes tacky. The heated cushion gum material 12 exits the heater 72 and passes over the forward end of the heater conveyor 58 and immediately onto the inflated tire casing 14 which is rotating at the same surface velocity as the heater conveyor 58. The forward roller 60 of the heater conveyor 58 applies the cushion gum material 12 with pressure, that is, presses the cushion gum material 12 onto the periphery of the tire casing 14. The combination of heat and pressure bonds the cushion gum material 12 to the tire casing 14 and forces out any trapped air. It is noted that the cushion gum material 12 does not contact the periphery of the tire casing 14 until it is pressed or pressured onto the tire casing 14 by the forward roller 60. It is also noted that the cushion gum material 12 is not tensioned once it has been heated so that the cushion gum material 12 is not stretched and an even thickness is maintained.

The drive motor 88 is stopped after a predetermined period of time. The predetermined period of time is equal to the time required for a predetermined length of cushion gum material 12, the length required to cover the periphery of the tire casing 14, to pass the cutting mechanism 82. Once the drive motor 88 is stopped, the cutting mechanism 82 is activated to cut the cushion gum material 12 at the predetermined length, as described above. It is noted that the cutting time must be kept to a minimum, preferably less than 10 seconds, so that the cushion gum material 12 in the heater 72 does not deteriorate. Alternatively, the temperature of the heater 72 can be controlled during the cutting delay so that the cushion gum material 12 remaining in the heater 72 is not overheated or scorched.

When the cutting cycle is complete, the drive motor 88 is activated and the remainder of the cut length of cushion gum material 12 is applied to the tire casing 14. Prior to activating the drive motor 88, the cam lever 50 is activated to disengage the pressure roller 48 from the supply roller 46 so that a new length of cushion gum material 12 is not fed into the heater 66. It will be noted that if the heater conveyor 58 is sized to hold full a length of material for the tire casing 14, the cutting operation takes place prior to beginning to apply the cushion gum material 12 to the tire casing 14. It will also be noted that if a precut length of cushion gum material 12 is used the drive motor 88 does not need to be stopped during the application of the cushion gum 12.

Once the cushion gum material 12 is applied to the entire periphery of the tire casing 14, the drive motor 88 is stopped and the carriage 22 is moved away from the tire casing 14. The above cycle is repeated when it is desired to apply the cushion gum material 12 to another tire casing 14.

Although a particular embodiment of the invention has been described in detail, it will be understood that the invention is not limited correspondingly in scope, but includes all changes and modifications coming within the spirit and terms of the claims appended hereto.

What is claimed is:

1. A method for applying cushion gum to a periphery of a tire casing, said method comprising the steps of:
   - (a) conveying and supporting cushion gum on a generally horizontal conveyor with a tire casing interface side of the cushion gum facing away from the conveyor;
   - (b) cutting the cushion gum to a predetermined length corresponding to the periphery of the tire casing;
   - (c) heating the cushion gum to a temperature at which the cushion gum becomes tacky with heating elements positioned above the conveyor and directly facing the interface side of the cushion gum; and
   - (d) applying and pressuring the cushion gum to the periphery of the tire casing with a forward roller of the conveyor as the cushion gum exits the conveyor and first contacts the tire casing.

2. The method according to claim 1, wherein the cushion gum is heated to a temperature in the range of about 100 degrees Fahrenheit to about 200 degrees Fahrenheit.

3. The method according to claim 2, wherein the cushion gum is heated to a temperature of about 150 degrees Fahrenheit.

4. The method according to claim 1, wherein the cushion gum is applied at a speed in the range of about 0.5 to about 2.0 feet per second.

5. The method according to claim 1, wherein the cushion gum is applied with a pressure in the range of about 10 pounds to about 30 pounds.

6. The method according to claim 1, wherein the step of cutting the cushion gum to the predetermined length includes cutting the cushion gum before the cushion gum is heated by the heating elements.

7. The method according to claim 6, wherein the step of cutting the cushion gum to the predetermined length includes cutting the cushion gum before the cushion gum enters the conveyor.

8. The method according to claim 7, wherein the step of cutting the cushion gum to the predetermined length includes supporting the cushion gum with a cutting anvil.

9. The method according to claim 1, wherein the step of heating the cushion gum includes heating the cushion gum with infrared heating elements.

10. The method according to claim 1, further comprising the step of pulling the cushion gum from a supply roll with a pinch roller.

11. The method according to claim 10, further comprising the step of supporting the cushion gum between the pinch roller and the conveyor.

* * * * *